Figure 1:
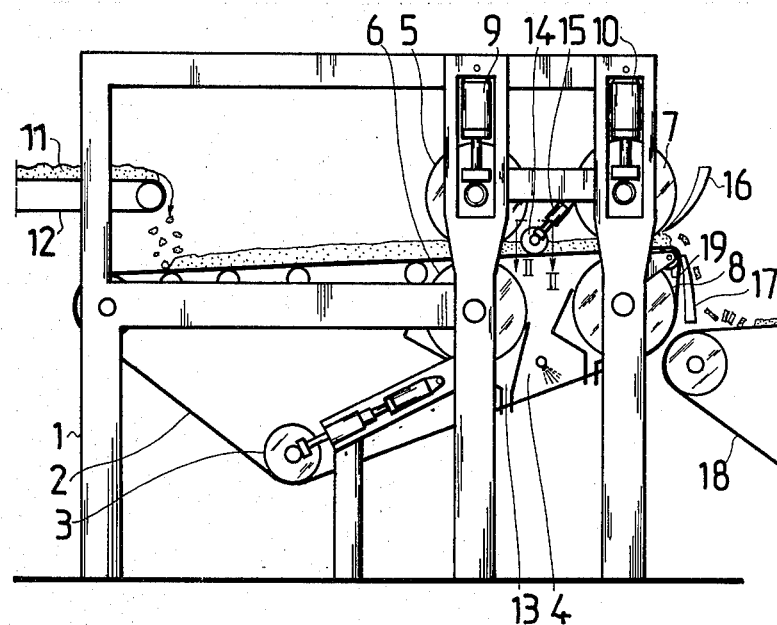

United States Patent [19]

Titoff

[11] 4,324,659
[45] Apr. 13, 1982

[54] LIME SLUDGE PRESS UNIT

[75] Inventor: Juha Titoff, Savonlinna, Finland

[73] Assignee: Enso-Gutzeit Osakehitö, Helsinki, Finland

[21] Appl. No.: 205,273

[22] Filed: Nov. 10, 1980

[30] Foreign Application Priority Data

Nov. 13, 1979 [FI] Finland .................................. 793549

[51] Int. Cl.$^3$ ........................................... B01D 33/04
[52] U.S. Cl. .................................. 210/386; 100/117; 100/154; 210/401; 210/408
[58] Field of Search ............... 210/386, 389, 391, 392, 210/400, 401, 408, 411; 100/118, 154, 117

[56] References Cited

U.S. PATENT DOCUMENTS

| | | | |
|---|---|---|---|
| 2,446,746 | 8/1948 | Denhalt et al. .................. | 210/386 |
| 3,796,317 | 3/1974 | Lippert et al. ................... | 210/401 |
| 3,891,549 | 6/1975 | Carmel et al. .................. | 210/386 |
| 4,153,550 | 5/1979 | Lautrette ........................... | 210/401 |
| 4,276,168 | 6/1981 | Bastgen ........................... | 210/401 |

*Primary Examiner*—Theodore A. Granger
*Attorney, Agent, or Firm*—Toren, McGeady & Stanger

[57] ABSTRACT

A lime sludge press unit comprising at least two pairs of press rolls, the lime sludge web passing, supported by an endless wire, through their press nips and moisture escaping from the lime sludge therein. After the first pair of rolls is located a lime sludge treatment screw transversal to the lime sludge web and which breaks up the pressed lime sludge web and carrying helical threads starting at its ends and opposite in direction so that these both transport the lime sludge from the margin of the web towards its center.

6 Claims, 2 Drawing Figures

U.S. Patent    Apr. 13, 1982    4,324,659

LIME SLUDGE PRESS UNIT

In cellulose production, regeneration of the digestion chemicals is a prerequisite of economy. One part of regeneration is the causticizing process, in which the soda liquor is treated with calsium hydroxide. As reaction product is obtained, on the side of sodium hydroxide, an insoluble precipitation, which is calcium carbonate $CaCO_3$, or lime sludge. The lime sludge and sodium hydroxide (or white liquor) are separated. The clear white liquor is reused in cellulose digesting. The separated lime sludge is washed and burned in a lime sludge kiln. Hereby the lime slude is decomposed into carbon dioxide and calcium oxide, the latter being reused in the causticizing process in the form of calcium hydroxide that has reacted with water.

The heat source employed in the lime sludge kiln is fuel oil or natural gas. The quantities of lime sludge that have to be processed in cellulose mills are very large: a modern cellulose mill treats about 300–400 tons of the material per day. It is therefore understandable that attempts are made to remove a maximum amount of water from the lime sludge prior to its introduction into the lime sludge kiln, in order to minimize the water quantity that has to be evaporated from the lime sludge in the kiln. Requirements regarding increase of the dry matter content in the lime sludge before its introduction into the lime sludge kiln have in fact continuously increased, and will continuously increase as the energy price goes up. If the dry matter content is bettered by a few percent units from the dry matter level in present use, this will at today's energy prices mean several hundred thousand Finnish marks in savings for a medium-sized cellulose mill.

In the procedure still in common use today, a drum filter is used to dry the lime sludge before it enters the lime sludge kiln. The dry matter obtained after the drum filter with the best modern filters is about 70-74%. Great demands of higher dry matter content are being made. It is certainly technically possible, with filters, to achieve a higher dry matter content, but this is no longer economically profitable because the size of the equipment and the energy requirements would increase unreasonably.

The object of the present invention is to provide a new type of lime sludge press unit comprising at least two pairs of press rolls, the lime sludge web passing through their press nips supported by an endless wire, and moisture escaping from the lime sludge therein. The invention is mainly characterized in that after the first pair of rolls is located a lime sludge treatment screw transversal with reference to the lime sludge web, and which breaks up the pressed lime sludge web, and the threads commencing at its ends being opposed in direction so that they both transport lime sludge from the margin of the web towards its centre.

By means of the lime sludge press of the invention a dry matter content is achieved which is substantially higher than with present equipment. In tests that were carried out, a dry matter content of 82-83% was obtained, while the energy consumption is substantially less than in present equipment.

The lime sludge press unit of the invention has one single filtering wire, which may consist of textile, plastic or metal fabric and which at the same time serves as conveyor for the lime sludge through the press unit. It is advantageous to dispose all press rolls to be driving rolls. This is better conducive to driving the lime sludge into the nips.

A special feature in the lime sludge press unit of the inventon is the lime sludge treatment screw which breaks up and collects the lime sludge cake coming from the first nip. In the first nip, the lime sludge cake spreads out powerfully, and it must be narrowed down so that it might not once again spread out in the second nip. Therefore such collecting of the cake with the aid of a screw is important.

One favourable embodiment of the invention is characterized in that the pitch of the lime sludge treatment screw decreases in the direction from the screw ends towards its centre. Hereby the lime sludge can be collected to form a uniform layer upon the wire.

Another favourable embodiment of the invention is characterized in that holes in the shaft of the treatment screw have been so placed and directed that air jets will play over the surface of the screw. Hereby the air flow prevents the sticking of the lime sludge to the screw in spite of the fact that lime sludge is a substance which adheres most readily to structural parts.

One more favourable embodiment is characterized in that after the last press roll pair is located an auxiliary roll which keeps the wire apart from the press roll so that there is only a line contact between them. It would be natural to return the wire, following along the surface of the lower roll in the second pair of rolls and back to the initial end of the press unit. But in that case the water could wet the lime sludge after the nip pressing. In order to prevent this from happening, the auxiliary roll has the task of detaching the wire from the surface of the lower roll in the second nip.

Press units as taught by the invention may be placed after each other, two or more, depending on the desired dry matter content. Hereby the use of different kinds of webs in different units, that is at different dry matter contents, is also made possible. This is important because experiments have shown that one and the same wire is not suited both for wet and for drier lime sludge. The wire washing and drying procedure is also better manageable in this way because the wires of the wet, and the drier, lime sludge require different washing and drying procedures. Moreover, the unit design affords possibilities for free placement of the units, that is, they can be placed one after the other, in zigzag configuration, or in both ways. Different units may on the other hand be mounted in one and the same frame, but units are then understood to mean entities constituted by different wires.

The invention is described in the following with reference to the attached drawing, wherein:

FIG. 1 displays, schematically, the lime sludge press unit according to one embodiment of the invention, in elevational view.

Figure 2:
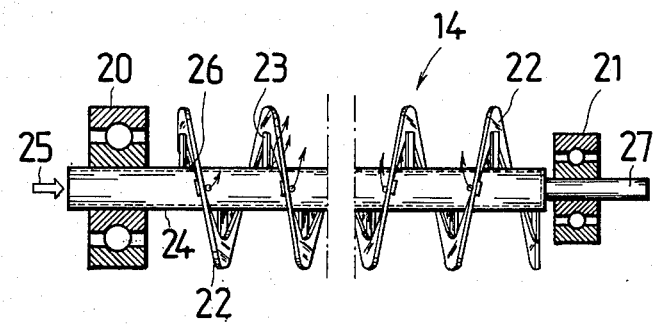

FIG. 2 shows the section carried along the line II—II in the figure.

In the drawing, reference numeral 1 refers to the frame of the lime sludge press unit, wherein has been disposed an endless wire 2, this wire being guided by various rolls. The tension of the wire is adjusted with the aid of the tensioning roll 3. Wire washing, and the drying of the wire with compressed air, take place in the washing and blowing box 4.

In the frame of the lime sludge press unit has been accommodated a first press roll pair 5, 6 and a second press roll pair 7, 8. The wire 2 passes through both press nips. The position of rolls 5 and 7 is adjustable vertically by means of pressure cylinders 9 and 10. All press rolls 5 through 8 are driving rolls.

The calcium carbonate sludge, or lime sludge, 11 which one desires to dry and which has a dry matter content in the order of 60%, is conveyed to the spot from a lime sludge filter (not depicted) by means of the belt conveyor 12. The lime sludge drops down on the top face of the wire 2 and moves therewith to the nip of the press roll pair 5, 6. In this nip takes place the organisation of the lime sludge cake and the expression of liquid through the wire 2 and onto the surface of the lower roll 6, whence it is drained into the drain chute 13. The lime sludge that has been pressed, and has therefore spread out, in the nip is scraped off the wire 2 and once more collected to form a narrower and more uniform layer, with the aid of the lime sludge treatment screw 14, which has been shown on a larger scale in FIG. 2. The lime sludge treatment screw 14 also serves the task to prevent the backward transfer of water from the wire 2 into the lime sludge cake, and to break up the lime sludge cake by disorganizing the crystals prior to the second pressing.

The design of the lime sludge treatment screw 14 is illustrated by FIG. 2. The shaft of the screw has been rotatably carried in the bearings 20 and 21. At one end of the screw starts a left-handed helix and at the opposite end, a right-handed helix. Both helices consist of a strip 22 which has been affixed to the shaft 24 by means of supports 23. Hereby the helix 22 is spaced from the shaft 24. The shaft 24 is hollow and compressed air is introduced thereinto at the end indicated by the arrow 25. The air discharges through holes 26 in the shaft 24. The holes 26 have been so placed and directed that air jets will play over the surface of the helical strip 22. The air jets serve the task of assisting the complete break-up of the lime sludge web and keeping the helical strip clean.

The lime sludge treatment screw 14 is positively driven. The drive mechanism, located at the end 27 of the shaft 24, has been omitted from the drawing in the interest of clarity. The screw rotates in such direction that the movement of the lime slude is from the sides of the web towards its centre. In the case depicted in the drawing, the helix has a constant pitch. According to one embodiment, the screw may be designed so that its pitch decreases from the ends to the centre of the screw. Hereby a more uniform disposition of the lime sludge layer is obtained. The position of the screw 14 is adjustable by means of the pressure cylinders 15.

After the treatment screw 14, the lime sludge enters the nip defined by the second pair of press rolls 7, 8. Here a reorganisation of the lime sludge cake takes place, and its pressing similarly as in the preceding nip. The pressures are kept constant in both nips independent of the quantity supplied; this is done with the aid of pressure cylinders 9 and 10.

After the second press nip, the lime sludge is scraped off the upper roll 7 with the doctor 16, and from the wire 2 with the doctor 17. The lime sludge drops, in the case depicted, to a press unit with a mode of operation and construction like the press unit just described, and of which in FIG. 1 the wire 18 has been depicted. This wire 18 is somewhat different from the wire 2 just described, because it is meant for the treatment of lime sludge which is drier.

After the press rolls 7 and 8, the wire 2 has been conducted over the auxiliary roll 19. This auxiliary roll 19 detaches the wire from the surface of the lower roll 8. Thereby the water which runs along the roll 8 cannot rewet the lime sludge after the nip pressing.

It is obvious to a person skilled in the art that various embodiments of the invention may vary within the scope of the claims presented below. It is for instance possible to the lime sludge press unit depicted in the drawing to add various kinds of apparatus to treat the lime sludge or the wire. But these are not essential from the viewpoint of the invention.

I claim:

1. Improvement in a lime sludge press unit comprising at least two pairs of press rolls, the lime sludge web passing, supported by an endless wire, through their press nips and moisture escaping from the lime sludge therein, wherein the improvement comprises that after the first pair of rolls is located a lime sludge treatment screw transversal to the lime sludge web and which breaks up the pressed lime sludge web and carrying helical threads starting at its ends and opposite in direction so that these both transport the lime sludge from the margin of the web towards its center.

2. Lime sludge press unit according to claim 1, characterized in that the pitch of the lime sludge treatment screw decreases from the ends of the screw towards its center.

3. Lime sludge press unit according to claim 1, characterized in that the shaft of the treatment screw is hollow and has been provided with holes for blowing air against the lime sludge web.

4. Lime sludge press unit according to claim 3, characterized in that the helix on the screw is spaced from the shaft.

5. Lime sludge press unit according to claim 3, characterized in that the holes have been so placed and directed that air jets play over the surface of the screw.

6. Lime sludge press unit according to claim 1, characterized in that after the last pair of press rolls is located an auxiliary roll which keeps the wire apart from the press roll so that there is only a line contact between them.

* * * * *